Oct. 6, 1931.  K. A. STERZEL  1,826,191
APPARATUS FOR COMPARING QUANTITIES OF ALTERNATING CURRENT SYSTEMS
Filed Oct. 11, 1929   3 Sheets-Sheet 2

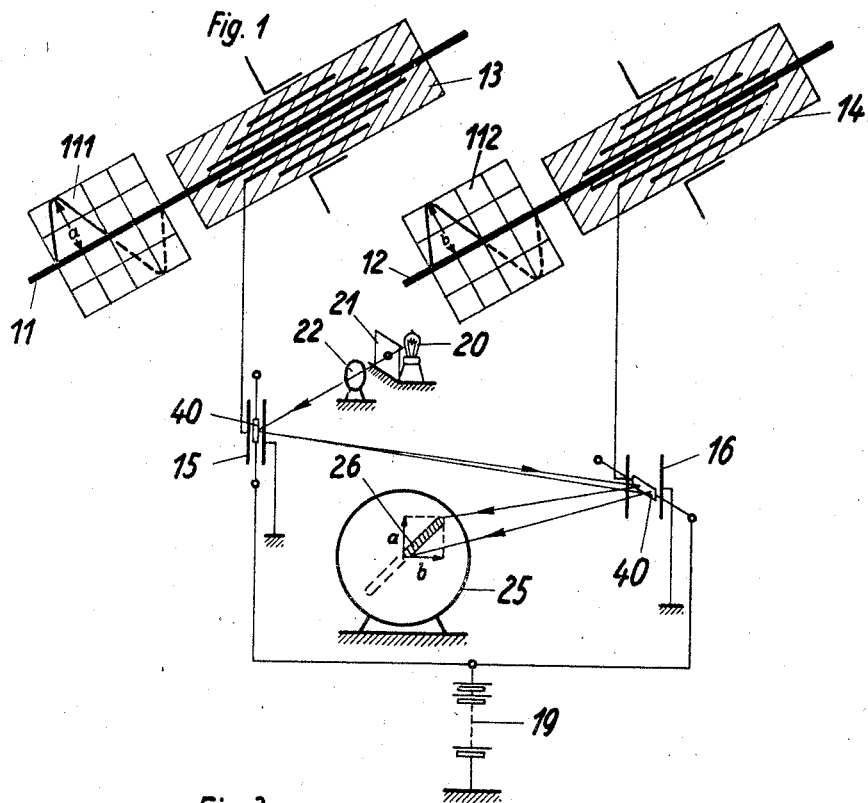
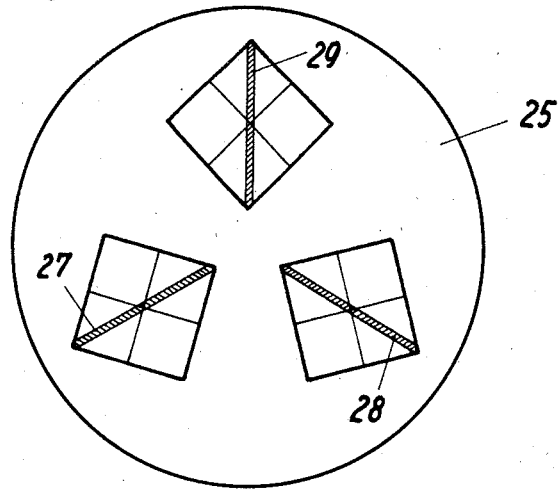

Inventor:
Kurt August Sterzel
by [signature]
Atty.

Patented Oct. 6, 1931

1,826,191

UNITED STATES PATENT OFFICE

KURT AUGUST STERZEL, OF DRESDEN, GERMANY, ASSIGNOR TO THE FIRM KOCH & STERZEL, AKTIENGESELLSCHAFT, OF DRESDEN, GERMANY

APPARATUS FOR COMPARING QUANTITIES OF ALTERNATING-CURRENT SYSTEMS

Application filed October 11, 1929, Serial No. 398,909, and in Germany October 16, 1928.

My invention relates to an apparatus for comparing quantities of alternating current systems, particularly with the object of synchronizing two systems.

To this end I provide electric appliances under the control of each system and adapted to oscillate under such control, and means capable of being actuated by the oscillations for indicating the electrical conditions of the systems.

In a preferred embodiment of my invention I provide means for comparing the oscillations of the two appliances.

My invention is based on the well-known physical apparatus for comparing the vibrations of two tuning forks. The forks are arranged with their axial planes at right angles to each other and each is provided with a mirror. A source of light is so arranged that its rays are reflected by the mirror of one of the forks to the mirror of the other fork and finally to a screen.

In the drawings affixed to this specification and forming part thereof various systems embodying my invention are illustrated diagrammatically by way of example.

In the drawings,

Fig. 1 is a partly perspective diagram showing two alternating current systems,

Fig. 3 is an elevation of the screen for the system in Fig. 2,

Figure 2:
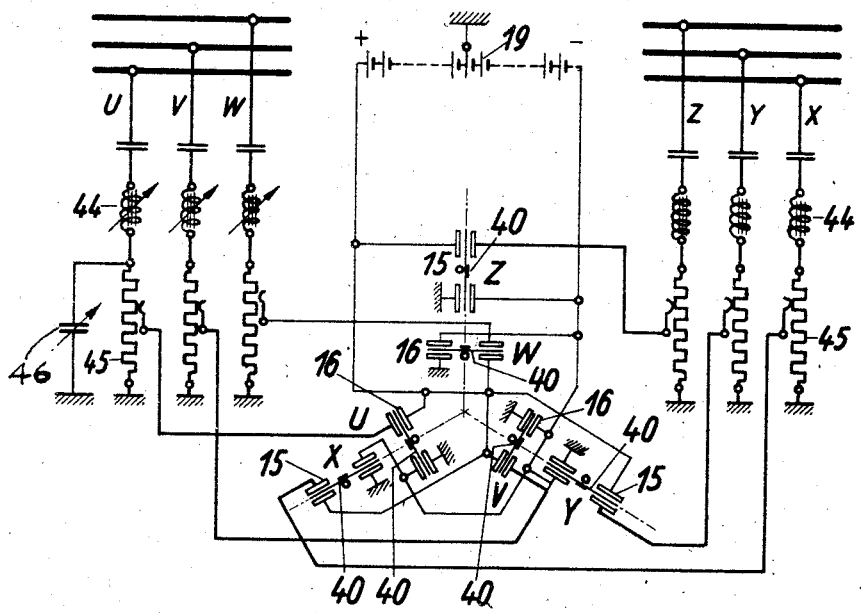
Fig. 2 is a diagram showing two three-phase systems.

Referring now to the drawings, and first to Fig. 1, 11 and 12 are the wires of two alternating-current systems which are to be compared and 111 and 112 are diagrams showing the current in the two systems plotted as ordinates $a$ and $b$, respectively.

The two systems are grounded through condenser bushings 13, 14 and condensers 15 and 16. Each condenser is provided with the usual plates and oscillating parts, as will be described with reference to Figs. 5 and 6 and are polarized from a source 19 of direct current. Each condenser is equipped with a mirror 40, the mirrors in the two condensers 15 and 16 being arranged with their axes of oscillation at right angles to each other.

20 is a source of light, 21 is a diaphragm and 22 is a lens through which the light from the source 20 is reflected to the mirror 40 of the condenser 15, thence to the mirror 40 of the condenser 16 and finally to a screen 25.

If the currents in the two systems 11 and 12 are equal as to period, intensity and direction, the rays from the mirror 40 in the condenser 16 mark on the screen 25 the resultant 26 from the two currents $a$ and $b$. If there are variations as to any data in the system, a light mark will appear in another position on the screen as indicated in dotted lines and the systems will now be regulated until the mark is in the correct position 26.

It will be understood from this description that the oscillations of the appliances 15 and 16 which are under electrostatic control are compared, and as the appliances are under the influence of the electrostatic fields of the two systems 11 and 12, the conditions prevailing in the systems are indicated on the screen 25.

Figure 4:
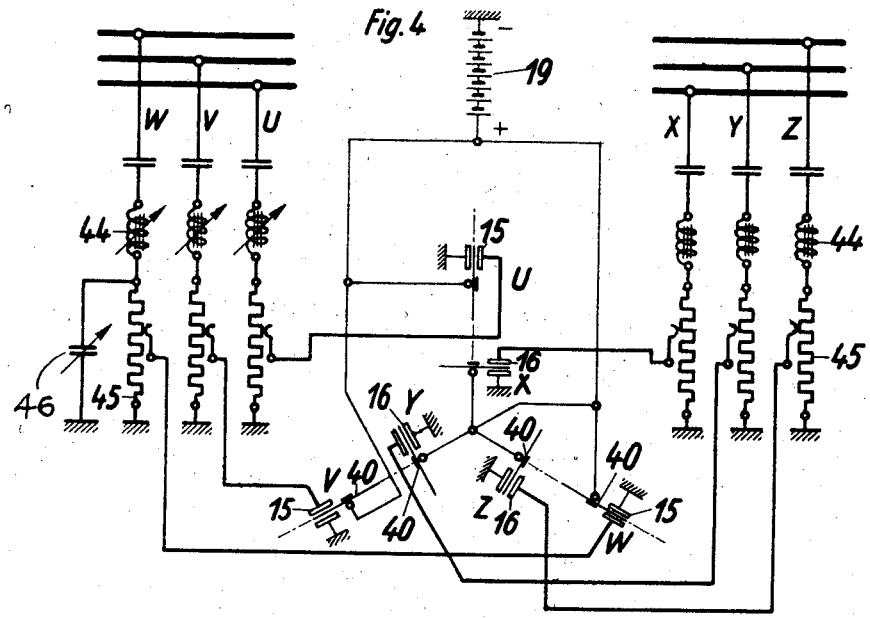
Fig. 4 is a diagram of a system similar to that in Fig. 2, but somewhat simplified.

Figs. 2, 3 and 4 illustrate a three-phase system having the phases UVW and XYZ. The corresponding phases are connected with a set of condensers 15 and 16, each equipped with a mirror 40. The appliances are marked with the letters of the phases to be compared (UX, VY and WZ) the battery 19 supplying direct current to all appliances.

In this system a single screen 25 (Fig. 3) is provided for the three pairs of phases, each mirror 40 in the respective appliances projecting on the screen a mark 27, 28 and 29, respectively. Preferably the marks are arranged at angles of 120°. The operation is the same as described with reference to Fig. 1.

Referring to Fig. 4, this system is substantially identical with the system shown in Fig. 2, but the battery 19 is grounded at one of its terminals so that the connections are simplified. 44 are variable ohmic resistances connected in series to the choke coils respectively. 46 are adjustable choke coils, and 45 are adjustable additional capacities in connection with the several phases as indicated for each of the phases U and W in Figs. 2 and 4. By varying the resistances of the resistors, the inductances of the choke coils or the capacities of the condensers inserted in the phases, I can vary the single components, the resultant of which is the light mark on the screen.

Figure 5:
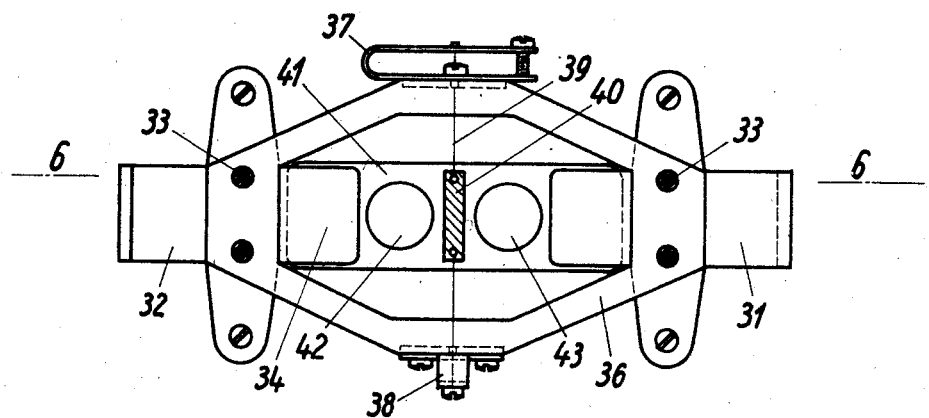
Fig. 5 is an elevation of one of the oscillating control appliances, drawn to a larger scale.
Figure 6:
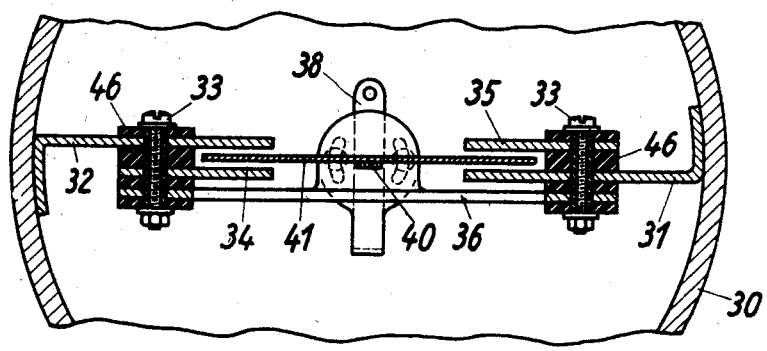
Fig. 6 is a section on the line 6—6 in Fig. 5.

Figs. 5 and 6 illustrate the construction of the condensers 15, 16. 30 is a grounded casing to which the plates 31 and 32 of the condenser are secured. 33 are insulated screws which through the medium of insulating strips 46 support on the plates 31 and 32 plates 34 and 35 which are connected with the systems or phases, as described with reference to Figs. 1, 2, and 4. 36 is a plate which is also supported by the screws 33, and is connected with the positive terminal of the battery 19. 39 is a torsional wire which is held under tension in a recess of the plate 36 by a screw 38 and a spring 37, so as to be tuned to about 50 Hertzian units. 40 is the mirror which is suspended from the wire 39 and 41 is a plate extending at right angles from either side of the mirror and serving for damping its oscillations by projecting between the inner ends of the plates 31, 35 and 32, 34. The light rays can pass through openings 42, 43 in the plate 41 which obviously, might also be recessed and open at one side. The plate 41 might also extend on one side of the mirror 40 only.

An oscillating appliance as described has the advantage that it may be tuned mechanically to the fundamental frequency, so that vibrations of higher frequency will not exert any influence on the oscillating system.

It will be understood that my apparatus may be used for comparing data of any kind, such as frequencies, voltages, currents, phase angles, etc. and it may also be used for synchronizing.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:

1. An apparatus for comparing electrical quantities of two alternating current systems comprising two oscillating mirrors controlled by electrostatic fields produced by the currents of each system, a source of light and a screen, said mirrors, said source of light and said screen being arranged in such manner that the light rays emitted by said source are reflected by said mirrors, one after the other, and then strike said screen.

2. An apparatus for comparing electrical quantities of two alternating current systems comprising two mechanical oscillators, each controlled by the current of one system, condenser plates arranged at opposite sides of said oscillators respectively, a direct voltage supply connected to said condenser plates, means for producing the resultant of the oscillations of said oscillators and means for making perceptible the resultant oscillation.

3. An apparatus for comparing electrical quantities of two alternating current systems comprising two torsional wires tuned to the natural frequency of said systems, two mechanical oscillators, supported by said wires and each controlled by the current of one system, means for producing the resultant of the oscillations of said oscillators and means for making perceptible the resultant oscillation.

4. An apparatus for comparing electrical quantities of two alternating current systems comprising two torsional wires tuned to the natural frequency of said systems, two mechanical oscillators, supported by said wires and each controlled by the current of one system, damping plates connected to said oscillators, means for producing the resultant of the oscillations of said oscillators and means for making perceptible the resultant oscillation.

5. An apparatus for comparing electrical quantities of two alternating current systems comprising two torsional wires tuned to the natural frequency of said systems, two mechanical oscillators, supported by said wires and each controlled by the current of one system, damping plates connected to said oscillators, the ends of said plates extending into the electric fields produced by the currents of said systems, means for producing the resultant of the oscillations of said oscillators and means for making perceptible the resultant oscillation.

6. An apparatus for comparing electrical quantities of two alternating current systems comprising two torsional wires arranged vertically to each other and tuned to the natural frequency of said systems, two damping plates supported by said wires and extending into the electric fields produced by the currents of said systems, two oscillating mirrors supported by said wires and controlled each by the current of one system, a source of light and a screen, said mirrors, said source of light and said screen being arranged in such manner that the light rays emitted by said source are reflected by said mirrors, one after the other and then strike said screen.

7. An apparatus for comparing electrical quantities of two alternating current systems comprising two torsional wires arranged vertically to each other and tuned to the natural frequency of said systems, two damping plates supported by said wires and extending into the electric fields produced by the currents of said systems, apertures in said plates, two oscillating mirrors each supported by one of said wires and controlled by the currents of each system, a source of light and a screen, said mirrors, said source of light and said screen being arranged in such manner that the light rays emitted by said source are reflected by said mirrors, one after the other, and then strike said screen.

8. An apparatus for comparing electrical quantities of two three-phase alternating current systems comprising three systems each comprising two oscillating mirrors according to claim 1, each system being under the control of one phase of each system respectively.

9. An apparatus for comparing electrical quantities of two three-phase alternating current systems comprising three systems each comprising two oscillating mirrors according to claim 1, each system being under the control of one phase of each system respectively, a screen and means for projecting the three light rays reflected by said mirror systems onto said screen so as to include angles of 120°.

In testimony whereof I affix my signature.

KURT AUGUST STERZEL.